United States Patent [19]

Boyd et al.

[11] 4,038,448
[45] July 26, 1977

[54] COMPOSITE GLASS ARTICLES SPONTANEOUS OPAL GLASS AND ENAMEL OF $Li_2$-O-$B_2$-$O_3$-$TiO_2$-$ZrO_2$-PbO-$SiO_2$

[75] Inventors: David C. Boyd, Corning; Francis A. Cantaloupe, Horseheads; William H. Dumbaugh, Jr., Painted Post; James E. Flannery, Corning; Louis M. Holleran, Painted Post; Sylvester R. Sandor; Dale R. Wexell, both of Corning, all of N.Y.

[73] Assignee: Corning Glass Works, Corning, N.Y.

[21] Appl. No.: 692,957

[22] Filed: June 4, 1976

[51] Int. Cl.$^2$ .................. B32B 7/02; C03C 5/02
[52] U.S. Cl. ........................ 428/212; 65/30 R; 106/49; 106/52; 106/53; 428/427; 428/428
[58] Field of Search .............. 106/49, 53, 52, 54; 428/427, 428, 212

[56] References Cited
U.S. PATENT DOCUMENTS

| | | | |
|---|---|---|---|
| 2,224,469 | 12/1940 | Blau | 106/52 |
| 3,404,027 | 10/1968 | Kosiorek | 428/427 |
| 3,510,343 | 5/1970 | Twells | 428/427 |
| 3,622,359 | 11/1971 | Pither | 106/52 X |
| 3,673,049 | 6/1972 | Giffen et al. | 428/428 X |

FOREIGN PATENT DOCUMENTS

| | | | |
|---|---|---|---|
| 43-7621 | 3/1968 | Japan | 428/428 |

OTHER PUBLICATIONS

Stewart, J. A., "Classification of Inorganic Enamels," The Glass Industry, Nov. 1965, pp. 654–656.

Primary Examiner—Helen M. McCarthy
Attorney, Agent, or Firm—Clinton S. Janes, Jr.; Clarence R. Patty, Jr.

[57] ABSTRACT

This invention relates to the production of a composite article consisting of an opal glass body exhibiting a dense, milky-white appearance coated with an adherent enamel demonstrating high gloss and exceptional chemical durability. More specifically, the opal glasses of the present invention have compositions within the $Na_2O$—$Al_2O_3$—$SiO_2$—F system and demonstrate a softening point in excess of 760° C., a strain point in excess of 490° C., and a coefficient of thermal expansion (0°–300° C.) of about 66–75 $\times$ $10^{-7}$/° C. The enamels of the instant invention have flux compositions within the $Li_2O$—$B_2O_3$—$TiO_2$—$ZrO_2$—PbO—$SiO_2$ system, will fire to a high gloss in less than about 10 minutes at temperatures below about 720° C., will exhibit coefficients of thermal expansion (25°–300° C.) about 3–10 points lower than the opal glass substrate, will demonstrate lead release after chemical attack of less than about 2 $\mu g/cm^2$, and will manifest excellent resistance to dishwasher detergents.

11 Claims, 1 Drawing Figure

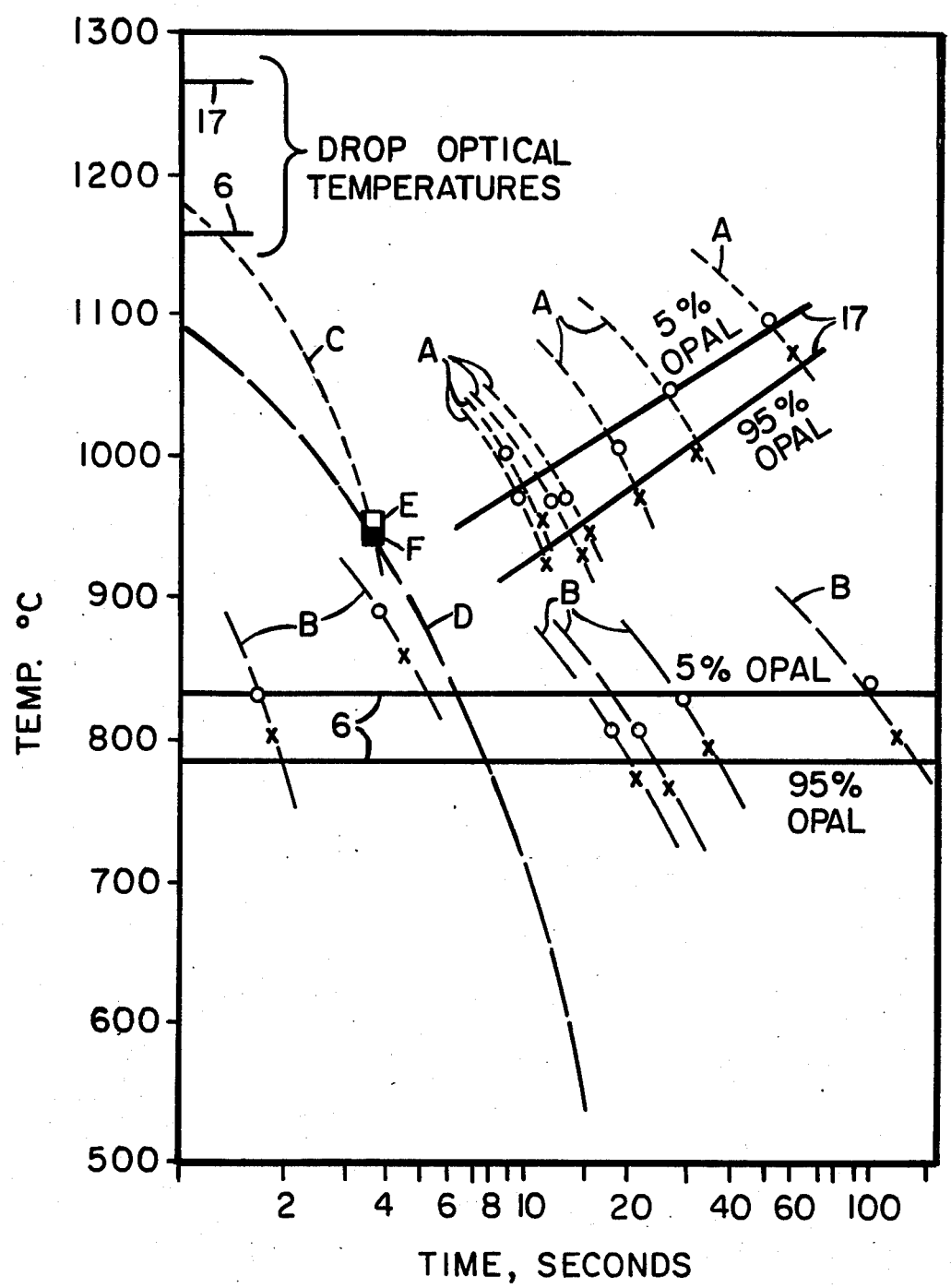

COMPOSITE GLASS ARTICLES, SPONTANEOUS OPAL GLASS AND ENAMEL OF $Li_2\text{-}O\text{-}B_2\text{-}O_3\text{-}TiO_2\text{-}PbO\text{-}SiO_2$

BACKGROUND OF THE INVENTION

Opal glasses have been known to the glass art for many years. These glasses have commonly been classified into two broad categories, viz., (1) spontaneous opal glasses, and (2) thermally opacifiable or reheatable opal glasses. The first category encompasses those compositions which develop opacity as the molten batch is cooled to a glass article, this opacity resulting from the growth of crystals in the glass or from some other type of phase separation phenomenon taking place within the glass. In the second category of glasses, little or no opacity is achieved when the molten batch is cooled. Opacity will develop, however, when the glass bodies are exposed to temperatures in the vicinity of or somewhat above the annealing point of the glass. Here, again, crystal growth or some other phase separation phenomenon produces the desired opacity. The crystal content developed is generally quite small, most usually less than 10% by volume, so that the overall physical characteristics of the glass, other than optical transmission, are affected only slightly, if at all.

Whereas such opal glasses can and have been marketed commercially when in the pristine state, i.e., with no glaze or other surface decorating medium applied thereto, consumer interest in such has been limited. This has been especially true where these materials have been utilized in such applications as culinary and table ware. There the customer demands a product which not only provides serviceable utility but is also aesthetically pleasing.

A dense, uniformly milky-white appearance has been deemed to constitute a most desirable attribute of opal glasses. Such glasses permit the manufacture of thin-walled and, therefore, lightweight articles, but which will still exhibit good opacity. However, such glasses have been subject to a serious problem termed "flask mark", when molded articles such as culinary and table ware have been produced therefrom. This defect is evidenced by an area of differential opacity near the bottom of such articles and is a frequent source of rejection for the ware. Also, because of their compositions and consequent physical properties, considerable difficulty has been experienced in devising applicable fired-on decorating materials.

Decorative enamels have been employed extensively in the past to impart color and/or gloss to opal glass articles. Such enamels are applied to the surface of the gloss in frit form and heated to a sufficiently high temperature to cause the enamel to fuse and flow smoothly over the surface, thereby attaining a homogeneous appearance and proper adherence to the glass substrate. Hence, the enamel must have a flow point which is at a low enough temperature to avoid thermal deformation of the opal glass substrate. Also, the enamel should have a coefficient of thermal expansion equivalent to, and preferably lower than that of, the opal glass to inhibit crazing or spalling and to place the enamel layer in compression after the firing step. Finally, lead and/or cadmium have commonly been included in enamels to provide a high refractive index and a low melting point thereto. However, those elements are extremely toxic which demands that the resistance of the enamel to chemical attack, e.g., acids, alkalies, and sulfides, be sufficiently great that release of those elements is extremely low. Thus, for food contact surfaces, a standard for lead release has been set as not exceeding about 2 $\mu g/cm^2$ of contact surface and that for cadmium, when present, as not exceeding about 0.2 $\mu g/cm^2$ of contact surface. For non-food contact surfaces, these standards are 50 $\mu g/cm^2$ and 5 $\mu g/cm^2$, respectively. The enamel also evidences good resistance to attack by household dishwasher detergent.

Opal glasses wherein the opacity mechanism is the presence of alkali metal or alkaline earth metal fluoride crystals have been known to the art for many years. For example, U.S. Pat. No. 2,224,469 describes spontaneous opal glasses containing sodium and/or potassium fluoride crystals and having compositions which are preferably free of $B_2O_3$ and consist essentially, in weight percent, of 13-16% alkali metal oxide, 5-9% $Al_2O_3$, 65-80% $SiO_2$, and at least 3% of analytically determined fluorine. As a further example, U.S. Pat. No. 2,921,860 discloses spontaneous opal glasses containing sodium fluoride crystals and having compositions consisting essentially, in weight percent, of 0.5-3% $Li_2O$, 6-19.5% $Na_2O$, the total alkali metal content being 12-20%, 2-12% $Al_2O_3$, 55-75% $SiO_2$, and 5-9% F. As a still further example, British Patent No. 1,289,185 discloses spontaneous opal glasses containing lithium fluoride and sodium fluoride and/or potassium fluoride crystals and having compositions consisting essentially, in weight percent, of 0.5-5% $Li_2O$, 2-18% $Na_2O$ and-/or $K_2O$, 1.5-12% $Al_2O_3$, 60-80% $SiO_2$, and 2-6% F.

Each of those patents describes spontaneous opal glasses which can be marketed commercially but there has been the desired to develop products demonstrating the opacity character equivalent to fine china while, at the same time, meeting stringent manufacturing and use requirements and avoiding the occurrence of flash mark during molding.

As was observed above, enamels for decorating ceramic bodies have been employed for many years. In general, the art has considered enamels to consist of two parts: the "flux" or glassy portion and the pigment. Pigments have been added as opacifiers and to provide coloring, where desired. In the usual practice, the pigment will comprise a minor portion of the enamel, normally less than about 20%, so it is the flux portion which customarily governs the overall properties of the enamel. And, therefore, it is the flux portion which has formed the source of considerable research to provide compatibility with various substrates while maintaining chemical durability, gloss, etc.

U.S. Pat. No. 2,225,162 is an early example of enamels which could be applied to glass substrates. Those enamels were stated to exhibit excellent resistance to attack by sulfur-containing materials and were formed from compositions consisting essentially, in weight percent, of 1-4% $Li_2O$, 1-6% $TiO_2$, 30-60% PbO, 30-50% $SiO_2$, and 0-10% $B_2O_3$. The preferred compositions contained equimolar amounts of $Li_2O$ and $Na_2O$. The exceptional resistance to sulfide attack was declared to be due to the joint presence of $Li_2O$ and $TiO_2$.

U.S. Pat. No. 2,278,868 provides glazes statedly demonstrating excellent resistance to the action of alkalies. Such glazes consisted essentially, in weight percent, of 2-15% $B_2O_3$, 0.5-10% $R_2O$, wherein $R_2O$ consists of 0-3% $Li_2O$, 0-5% $Na_2O$, and 0-8% $K_2O$, 1-10% $ZrO_2$, 40-60% PbO, and 20-30% $SiO_2$. The presence of $ZrO_2$ is observed to impart the exceptional resistance to alkalies. The disclosure notes that, whereas $Li_2O$ is the preferred $R_2O$ component for maximum resistance to alkalies, its presence leads to incompatibility between the expansion of the glass substrate and the glaze. Therefore, $Na_2O$ is the preferred $R_2O$.

U.S. Pat. No. 2,312,788 involves enamels statedly demonstrating high resistance to acids, alkalies, and sulphides consisting essentially, in weight percent, of about 1.5% $Li_2O$, 3% $TiO_2$, 6% $ZrO_2$, 4% $Na_2O$, 3% CdO, 7.5% $B_2O_3$, 49% PbO, and 25% $SiO_2$.

U.S. Pat. No. 2,356,316 describes enamels exhibiting improved alkali resistance consisting essentially, in weight percent, of about 3-7% $Na_2O$, 3-12% $B_2O_3$, 5-15% BaO + $ZrO_2$, 40-60% PbO, and 22-32% $SiO_2$. Where acid resistance is also desired, up to 5% $TiO_2$ can be added. The inclusion of BaO or $ZrO_2$ alone will improve resistance to alkali attack, but the combination of the two is even more beneficial and the final gloss is better.

U.S. Pat. No. 3,404,027 discloses enamels for glassware displaying a satin finish composed of a flux consisting essentially, in weight percent, of 0.5-4% $Na_2O$, 2-10% $B_2O_3$, 0-3% $Li_2O$, 0-5% $ZrO_2$, 0-8% $TiO_2$, 50-65% PbO, and 25-35% $SiO_2$ which is combined with mill additions of 0.1-4% $Cb_2O_5$ and 10-30% $TiO_2$ and/or $Al_2O_3$.

Nevertheless, as has been explained above, the use of a particular enamel is governed by its compatibility with the substrate to which it is applied. Of extreme importance are the flowpoint and coefficient of thermal expansion of the enamel in relation to the softening point and expansion of the substrate. Therefore, an enamel of singularly-defined properties is required for the desired opal glass referred to above having an opacity character equivalent to fine china and meeting stringent manufacturing and use requirements while avoiding the problem of flash mark during molding.

OBJECTIVES OF THE INVENTION

The principal objective of the instant invention is to provide a composite body comprising a substrate material consisting of an opal glass exhibiting a dense, uniformly milky-white appearance with an adherent enamel thereon demonstrating high gloss and exceptional chemical durability.

Another objective of this invention is to provide a composite body consisting of an opal glass underbody with an adherent enamel thereon which is emitently suitable for cooking and serving food preparations thereon.

SUMMARY OF THE INVENTION

We have discovered that those objectives can be achieved through the careful selection of opal glass and enamel compositions. Thus, besides the demanded milky-white opacity equivalent to fine china, the opal glass will exhibit a softening point in excess of 760° C., a strain point in excess of 490° C., a coefficient of thermal expansion over the range of 0°-300° C. of between about 66-75 $\times$ 10$^{-7}$/° C., and good chemical durability. The enamel flux will fire to a high gloss in less than about 10 minutes at temperatures less than about 720° C., will exhibit excellent chemical durability, and have a coefficient of thermal expansion over the range of 25°-300° C. of about 3-10 points lower than that of the opal glass underbody such that the enamel surface is under compression after firing. Commonly, the coefficients of thermal expansion (25°-300° C.) will range between about 57-70 $\times$ 10$^{-7}$/° C.

Opal glasses operable in the instant invention will have compositions consisting essentially, as expressed in weight percent on the oxide basis, of 8-13% $Na_2O$, 5-9% $Al_2O_3$, 74-78% $SiO_2$, and 3.5-4.5% F as analyzed. Useful optional additions for modifying the melting, forming, and/or opacifying characteristics or to alter the final physical properties of the glass include 0-4% $K_2O$, 0-2.5% SrO, and 0-1% $Li_2O$. Various other additions can also be tolerated in small amounts but the sum of all ingredients extraneous to the base $Na_2O$-$Al_2O_3$-$SiO_2$-F quaternary will be held below 5% of the total composition.

Enamel fluxes operable in the present invention will have compositions consisting essentially, as expressed in weight percent on the oxide basis, of 0.5-3% $Li_2O$, 4-8% $B_2O_3$, 1-5% $TiO_2$, 3-8% $ZrO_2$, 45-55% PbO, and 28-38% $SiO_2$. Adjustments in gloss quality and viscosity characteristics can be brought about through additions of 0-4% CdO, 0-3% ZnO, and 0-3% $Al_2O_3$. Additions of 0-3% $Y_2O_3$, 0-4% $Ta_2O_5$, and 0-2% $SnO_2$ can be used effectively to lower the coefficient of thermal expansion while maintaining the required high level of chemical durability. Very minor amounts of other ingredients can be tolerated, but the sum of all additions outside of the base six-component system will be maintained below 8% and, most preferably, below 5%.

DESCRIPTION OF PREFERRED EMBODIMENTS

Table I records glass compositions, expressed in parts by weight on the oxide basis, illustrating the composition parameters of the instant invention. Since it is not known with which cation(s) the fluorine is combined, it is merely reported as fluoride (F) in accordance with conventional glass analytical practice. Also, inasmuch as the sum of the components totals approximately 100, the values tabulated can reasonably be deemed to be expressed in terms of weight percent. In several of the examples, the amount of fluoride as fill (F) in the batch materials and the amount of fluoride as analyzed (A) in the final glass are recorded. A comparison of those values illustrates a loss of about 5-10%. $As_2O_3$ performs its customary function as a fining agent and also appears to enhance the whiteness of the opacity.

The actual batch ingredients can comprise any materials, either the oxide or other compounds, which, when melted together, will be converted into the desired oxide in the proper proportions. The batch ingredients were compounded, ballmilled together to aid in securing a homogeneous melt, and then deposited into platinum crucibles. The crucibles were covered and placed into an electrically-fired furance operating at 1500° C. After melting for four hours with stirring, the molten batches were cast into steel molds to yield 6 $\times$ 6 $\times$ ½ inch slabs and these slabs were immediately transferred to an annealer operating at 540° C.

TABLE I

|  | 1 | 2 | 3 | 4 | 5 | 6 | 7 | 8 |
|---|---|---|---|---|---|---|---|---|
| $SiO_2$ | 77.0 | 77.0 | 77.0 | 77.0 | 77.0 | 77.0 | 75.9 | 75.5 |
| $Al_2O_3$ | 6.0 | 6.0 | 6.0 | 6.0 | 6.0 | 6.0 | 6.0 | 5.9 |
| $Na_2O$ | 11.78 | 11.78 | 11.78 | 11.78 | 11.78 | 11.8 | 11.6 | 10.9 |
| $K_2O$ | 1.22 | 1.22 | 1.22 | 1.22 | 1.22 | 1.2 | 1.2 | 1.2 |

TABLE I-continued

|        | 1    | 2    | 3    | 4    | 5    | 6   | 7   | 8   |
|--------|------|------|------|------|------|-----|-----|-----|
| F (F)  | 5.0  | 4.44 | 4.17 | 3.89 | 3.61 | 4.4 | 4.2 | 4.2 |
| F (A)  | 4.5  | 4.10 | 3.79 | 3.69 | 3.34 | 3.9 | —   | —   |
| $As_2O_3$ | —    | —    | —    | —    | —    | —   | 0.2 | 0.2 |
| CaO    | —    | —    | —    | —    | —    | —   | —   | 1.1 |

|         | 9    | 10   | 11   | 12   | 13   | 14   | 15   | 16   | 17    |
|---------|------|------|------|------|------|------|------|------|-------|
| $SiO_2$ | 74.7 | 75.1 | 76.2 | 76.5 | 76.8 | 74.8 | 73.6 | 77.0 | 77.42 |
| $Al_2O_3$ | 5.9 | 5.9 | 6.0 | 6.0 | 6.0 | 7.0 | 8.0 | 6.3 | 10.25 |
| $Na_2O$ | 10.8 | 10.3 | 11.2 | 10.8 | 10.3 | 11.5 | 11.3 | 11.4 | 5.50 |
| $K_2O$  | 1.2  | 1.2  | 1.0  | 0.7  | 0.5  | 1.4  | 1.6  | 1.3  | 6.28 |
| F (F)   | 4.1  | 4.2  | 4.2  | 4.2  | 4.2  | 4.2  | 4.2  | 4.0  | 4.80 |
| $As_2O_3$ | 0.2 | 0.2 | 0.2 | 0.2 | 0.2 | 0.2 | 0.2 | 0.2 | 0.25 |
| CaO     | —    | 2.2  | —    | —    | —    | —    | —    | —    | —    |
| SrO     | 2.1  | —    | —    | —    | —    | —    | —    | —    | 7.91 |
| $Li_2O$ | —    | —    | 0.3  | 0.6  | 0.9  | —    | —    | —    | 1.55 |

Examples 1–5 are of interest in illustrating the fluoride level necessary to achieve the desired dense white opal. Thus, Examples 1 and 2 are very densely opacified, Examples 3 and 4 are marginal in opacity, and Example 5 shows definitely inadequate opacity. Analyzed fluoride contents in excess of 4.5% do not appear to improve opacity and can lead to reduced chemical durability.

Table II recites various physical properties determined on Examples 6–17 utilizing measuring techniques conventional in the glass art. Such include softening point (S.P.) in ° C., annealing point (A.P.) in ° C., strain point (St.P.) in ° C., coefficient of thermal expansion (Exp.) over the temperature range of 0°–300° C. × $10^{-7}$/° C., and density (Den.) in g/cc. The opal liquidus (Liq.) in ° C. was measured utilizing a hot stage microscope apparatus. Each of the examples demonstrated dense white opacity.

TABLE II

|       | 6     | 7     | 8     | 9     | 10    | 11    |
|-------|-------|-------|-------|-------|-------|-------|
| S.P.  | 773   | 770   | 762   | 761   | 755   | 762   |
| A.P.  | 562   | 567   | 556   | 560   | 550   | 553   |
| St.P. | 509   | 526   | 513   | 515   | 510   | 507   |
| Exp.  | 72    | 73.6  | 73.0  | 73.5  | 72.5  | 72.7  |
| Dens. | 2.336 | 2.352 | 2.353 | 2.372 | 2.361 | 2.340 |
| Liq.  | 860   | 805   | 865   | 875   | 920   | 810   |

|       | 12    | 13    | 14    | 15    | 16    | 17    |
|-------|-------|-------|-------|-------|-------|-------|
| S.P.  | 756   | 753   | 766   | 760   | 780   | —     |
| A.P.  | 548   | 546   | 576   | 573   | 575   | 571   |
| St.P. | 502   | 499   | 528   | 529   | 529   | 529   |
| Exp.  | 71.5  | 70.1  | 74.1  | 74.5  | 71    | 71.8  |
| Dens. | 2.333 | 2.329 | 2.353 | 2.359 | 2.33  | 2.344 |
| Liq.  | 800   | 965   | 700   | 700   |       |       |

Several general comments can be made relating to various effects of composition modifications. The substitution of $K_2O$ for part of the $Na_2O$ contents leads to a less dense opacity. The total replacement of $Na_2O$ with $K_2O$ results in a clear glass. The substitution of part of the $Na_2O$ with MgO or BaO likewise appears to reduce opacity. SrO and CaO raise opal liquidus but not only do not appear to improve opacity, but, in amounts of as little as 1%, begin to degrade opacity. The substitution of $Li_2O$ for $Na_2O$ improves the opalization strike-in rate (the rate at which the opal phase developes spontaneously upon cooling the melt to a glass), raises the opal liquidus, lowers the coefficient of thermal expansion, and reduces the viscosity in the transformation range. However, $Li_2O$ contents above about 1% cannot be tolerated because it enhances the undesirable phenomenon of flash mark.

The glass has the capability of being thermally tempered and, upon reheating to the tempering temperature range (somewhat below the softening point of the glass) for a brief period of time, any minor opacity variations caused during the forming process will be removed. As illustrative of this, when Example 16 was heated to about 710° C. for about 2–3 minutes and then cooled, the opacity appeared to be somewhat more dense. This practice can be especially useful in thin-walled articles which may cool so rapidly during the forming step that time is insufficient for complete opalization. However, reheating to the tempering temperature for no more than about 5 minutes will provide very dense opacity.

The uniqueness of Example 6, the preferred composition involves its tendency to opacify, i.e., to phase separate and develop NaF crystals as a second phase. The appended graph serves to illustrate this phenomenon by comparing the opacification characteristics of Example 6 with those of Example 17.

Hence, careful measurements were made with an apparatus designed to measure and record graphically the optical transmission (the opacity) of a glass sample as a function of both time and temperature (between 1250° C. and 500° C.). The optical transmission was measured a number of times at many different cooling rates. The appended drawing provides a composite of the results for the two glasses in graphic form. Thus, there are two lines depicting 5% and 95% opacity for glasses 6 and 17. The lines connect the corresponding measurements (extracted from transmission curves) obtained utilizing several different cooling rates. The "drop optical temperature" is that temperature, measured with an optical pyrometer, at which the glass is at the proper viscosity to be permitted to drop as a gob into a mold for shaping.

Example 17 can be subject to differential opacity, particularly in thin-walled sections, and the graph clearly demonstrates a severe cooling rate dependence of the temperature at which opacification takes place. As can be observed, when the temperature of Example 17 is caused to drop rapidly, i.e., 300° C. in 10 seconds, the temperature of 5% opacification is about 975° C. However, when the temperature of Example 17 is reduced more slowly, i.e., 150° C. in 50 seconds, the temperature of 5% opacification is 1100° C. In contrast, Example 6 manifests little cooling rate dependence. Hence, whether the cooling rate is 300° C. in 1.5 seconds or 300° C. in 70 seconds, the 5% opacification temperature remains about 820° C. In sum, differential cooling rate will be unlikely to cause differential opacification in Example 6.

The appended drawing also illustrates a practical unfavorable aspect of this difference in opacification tendency existing between Examples 6 and 17. Thus, the graph sets forth the projected cooling rates of these two glasses (Curves C and D for Examples 17 and 6, respectively) as if they were to be pressed into table ware objects employing an automatic pressing apparatus. The squares at about 938° C. (designated as E and F for Examples 17 and 6, respectively) are the glass temperatures at the pressing time (here indicated as three seconds after the glass reaches the drop optical temperature). When the Example 17 opacification curves are projected to this cooling rate, it is apparent that the glass will be pressed while it is still opacifying, thereby causing differential cooling with consequent differential opacification. In contrast, Example 6 will not opacify until after pressing, i.e, after differential cooling, thereby insuring against differential opacification.

Table III records enamel flux compositions, expressed in parts by weight on the oxide basis, demonstrating the operable composition parameters of the present invention. Because the sum of the individual components totals approximately 100, the tabulated values can reasonably be considered to be reported in terms of weight percent.

The actual batch ingredients employed can comprise any materials, either the oxide or other compounds, which, when melted together, will be converted into the desired oxide in the proper proportions. The batch ingredients were compounded, ballmilled together to assist in achieving a homogeneous melt, and then deposited into silica crucibles. The crucibles were covered and placed into an electrically-fired furnace operating at 1200°-1350° C. After melting for 2-3 hours with stirring, the molten batches were either poured into distilled water or run through water-cooled steel rollers to facilitate subsequent crushing to pass a No. 400 United States Standard Sieve (37 microns). Cane about 0.25 inch in diameter was hand drawn for use in measuring the coefficient of thermal expansion over 25°-300° C. ($\times 10^{-7}/°$ C.).

TABLE III

| | 1 | 2 | 3 | 4 | 5 | 6 | 7 |
|---|---|---|---|---|---|---|---|
| $SiO_2$ | 30.50 | 30.71 | 33.60 | 34.90 | 30.51 | 33.54 | 29.94 |
| PbO | 52.37 | 52.63 | 51.0 | 48.00 | 53.40 | 52.50 | 51.30 |
| $B_2O_3$ | 5.20 | 5.23 | 5.35 | 5.80 | 4.95 | 5.27 | 5.10 |
| $Li_2O$ | 1.93 | 2.23 | 1.06 | 1.91 | 1.07 | 1.14 | 1.11 |
| CdO | 3.26 | 3.28 | 1.80 | 2.96 | — | — | 3.19 |
| $TiO_2$ | 2.49 | 1.72 | 2.13 | 2.42 | 3.11 | 3.31 | 3.20 |
| $ZrO_2$ | 4.18 | 4.20 | 5.06 | 4.07 | 6.96 | 4.24 | 6.16 |
| Exp. | 62.4 | 62.5 | 58.7 | 61.5 | 57.6 | 60.5 | 59.7 |
| | 8 | 9 | 10 | 11 | 12 | 13 | 14 |
| $SiO_2$ | 36.28 | 30.25 | 34.90 | 34.87 | 29.81 | 29.32 | 33.23 |
| PbO | 48.45 | 51.87 | 48.80 | 48.76 | 52.04 | 51.19 | 50.04 |
| $B_2O_3$ | 5.24 | 5.15 | 5.0 | 5.0 | 5.84 | 5.74 | 5.24 |
| $Li_2O$ | 1.53 | 1.91 | 1.91 | 1.91 | 1.62 | 1.60 | 1.06 |
| CdO | 1.60 | 3.23 | 2.96 | 1.96 | 0.75 | 0.74 | 1.84 |
| $TiO_2$ | 2.11 | 2.46 | 2.00 | 2.43 | 2.48 | 2.62 | 2.09 |
| $ZrO_2$ | 4.17 | 2.95 | 3.57 | 4.07 | 3.27 | 4.09 | 6.50 |
| ZnO | 0.63 | — | — | — | — | 1.55 | — |
| $Y_2O_3$ | — | 2.17 | — | — | — | — | — |
| $SnO_2$ | — | — | 0.92 | — | — | — | — |
| $Ta_2O_5$ | — | — | — | 1.00 | 3.20 | 3.15 | — |
| $Al_2O_3$ | — | — | — | — | 0.99 | — | — |
| Exp. | 59.1 | 62.0 | 63.1 | 62.3 | 61.1 | 60.4 | 59.3 |

The flow, agglomeration, and glass characteristics of the enamel flux were determined by pressing the −400 mesh particles into 0.5 inch diameter pellets and firing the pellets at about 650°-700° C. for no more than about 10 minutes. Each of the exemplary compositions of Table III flowed to a good glossy surface in about 5-7 minutes.

To test the resistance of the enamel flux to detergents, the flux was comminuted for silk screening onto two inch square samples of the opal glasses reported in Table I. After firing for 5-8 minutes at 650° C.-700° C., the squares were subjected to the following procedure. A 0.3% by weight aqueous solution of Super Soilax detergent, marketed by Economics Laboratories, St. Paul, Minnesota, was prepared. The solution was heated to 95° C. and a square of the flux-coated opal glass immersed therein. After 24 hours in the hot solution, the square was removed, rinsed in distilled water, and dried. All of the samples manifested essentially no loss of gloss, the lead release (derived from analyzing the detergent solution after the test) was less than 2 $\mu g/cm^2$ of sample surface area, and the cadmium release, where present, was less than 0.2 $\mu g/cm^2$.

As further evidence of the detergent resistance of the enamel flux, a flux-coated square was immersed into the heated aqueous solution of Super Soilax above for 24 hours, removed from the solution, rinsed in tap water, and dried. A portion of the surface was then coated with Spotcheck dye penetrant, marketed by Magnaflux Corporation, Chicago, Illinois, and the dye allowed to stand thereon for 20 seconds. The dye is thereafter dried with a clean cloth and the surface then cleaned with a household cleansing powder for about 30 seconds. In each case, essentially no stain persisted.

The exceptionally desirable properties exhibited by the enamel fluxes of the instant invention are due to the unique combination of components in carefully-defined proportions. Thus, a high PbO content is required to produce a low softening point and to induce a low modulus of elasticity which imparts "stretching" capability to the flux. PbO, and to a lesser extent CdO, are necessary to yield high brilliancy, resulting from a high index of refraction. These constituents also inhibit devitrification and reduce the surface tension of the molten glass, thereby aiding homogenization and creating surface smoothness.

$B_2O_3$ exhibits an advantageously strong solvent action on the coloring agents conventionally employed in enamels, e.g., cobalt aluminate, lead antimonate, cadmium sulfoselenide, and lead chromate. $B_2O_3$ also reduces the coefficient of thermal expansion, inhibits devitrification, and reduces surface tension.

One very important feature of the instant invention is the use of $Li_2O$ as essentially the sole alkali metal component. The alkali metals greatly increase the fluidity of the molten enamel and contribute to the resultant brilliancy of the fused product. However, $Na_2O$ and, to a somewhat lesser extent, $K_2O$ sharply increase the coefficient of thermal expansion, thereby hazarding surface cracking and crazing. The low alkali content of the enamel fluxes also results in improved chemical durability. Thus, the presence of $Na_2O$ and $K_2O$ in lead-containing enamels decreases their durability and increases the lead release therefrom. This is a particularly aggravated problem when the enamel is placed in an acid environment. The acid leaches out the alkali metal ions before lead (and cadmium) ions, thereby creating pathways which facilitate the subsequent removal of lead (and cadmium) ions. Therefore, the preferred products will be essentially free from alkali metal oxides other than $Li_2O$.

Another critical feature of the present enamels is the inclusion of both $TiO_2$ and $ZrO_2$ to secure excellent resistance to alkalies and to achieve lead releases below about 2 $\mu g/cm^2$ and cadmium releases below about 0.2 $\mu g/cm^2$. It is believed that the inclusion of $TiO_2$ and $ZrO_2$ in the glass structure acts to densify the structure by promoting crosslinking and substantially reducing the number of unbonded oxygen atoms therein. Such densification is postulated to inhibit the diffusion of chemical agents into the glass structure with subsequent attack thereof.

It will be recognized that pigments are customarily included in decorative enamels. Any of the known ceramic pigments can be introduced into the fluxes of the instant invention by milling or grinding. Or, if preferred, the coloring compound may be combined and melted with the flux batch ingredients. Commonly, the proportion of pigment will comprise about 2–10%, based upon the total weight of the flux. Neither the identity of, nor the manner of incorporating, the pigment constitutes any part of the present invention, since the introduction of the pigment does not substantially alter the basic characteristics of the inventive enamel fluxes. Because of their inherent high indices of refraction, the fluxes of the present invention require a lesser amount of pigment than conventional enamels to produce the same density and brightness of color.

For exhibiting excellent high gloss, exceptional chemical durability, and very low lead and cadmium release, and good flow when applied to the opal glass substrate, the preferred enamel fluxes consist essentially, in weight percent, of about 1–1.5% $Li_2O$, 5–6% $B_2O_3$, 2–2.5% $TiO_2$, 4–6% $ZrO_2$, 48–51% PbO, 1–2% CdO, and 33–37% $SiO_2$.

We claim:
1. A composite article consisting of an opal glass body exhibiting a dense, milky-white appearance and an adherent enamel demonstrating high gloss and exceptional chemical durability, said opal glass consisting essentially, in weight percent on the oxide basis, of about 8–13% $Na_2O$, 5–9% $Al_2O_3$, 74–78% $SiO_2$, and 3.5–4.5% F as analyzed, and said enamel having a flux composition being essentially free from alkali metal oxides other than $Li_2O$ and consisting essentially, in weight percent on the oxide basis, of about 0.5–3% $Li_2O$, 4–8% $B_2O_3$, 1–5% $TiO_2$, 3–8% $ZrO_2$, 45–55% PbO, and 28–38% $SiO_2$, wherein opal glass exhibits softening point in excess of 760° C., a strain point in excess of 490° C., and a coefficient of thermal expansion (0°–300° C.) of about 66–75×10$^{-7}$/° C, and wherein said enamel flux exhibits a coefficient of thermal expansion (25°–300° C.) about 3–10 points lower than that of said opal glass, a lead release after chemical attack of less than 2 $\mu g/cm^2$, and will fire to a high gloss in less than about ten minutes at temperatures below 720° C.

2. A composite article according to claim 1 wherein said opal glass also contains 0–4% $K_2O$, 0–2.5% SrO, and 0–1% $Li_2O$.

3. A composite article according to claim 1 wherein the sum of all additions to the $Na_2O$-$Al_2O_3$-$SiO_2$-F opal glass system is no more than 5% of the total composition.

4. A composite article according to claim 2 wherein said opal glass consists essentially, in weight percent on the oxide basis, of about 11.8% $Na_2O$, 6% $Al_2O_3$, 77% $SiO_2$, 1.2% $K_2O$, and 4% F as analyzed.

5. A composite article according to claim 1 wherein said enamel flux also contains 0–4% CdO, 0–3% ZnO, 0–3% $Al_2O_3$, 0–3% $Y_2O_3$, 0–4% $Ta_2O_5$, and 0–2% $SnO_2$.

6. A composite article according to claim 1 wherein the sum of all additions to the $Li_2O$-$B_2O_3$-$TiO_2$-$ZrO_2$-PbO-$SiO_2$ enamel flux is no more than 8% of the total composition.

7. A spontaneous opal glass body exhibiting a dense, milky-white appearance, a softening point in excess of 760° C., a strain point in excess of 490° C., and a coefficient of thermal expansion (0°–300° C.) of about 66–75 × 10$^{-7}$/° C. consisting essentially, in weight percent on the oxide basis, of about 11.8% $Na_2O$, 6% $Al_2O_3$, 77% $SiO_2$, 1.2% $K_2O$, and 4% F, as analyzed.

8. An enamel having a flux composition essentially free from alkali metal oxides other than $Li_2O$ which exhibits a coefficient of thermal expansion (25°–300° C.) of about 57–70 × 10$^{-7}$/° C., a lead release after chemical attack of less than about 2 $\mu g/cm^2$, and will fire to a high gloss in less than about 10 minutes at temperatures below 720° C., said flux consisting essentially, in weight percent on the oxide basis, of about 0.5–3% $Li_2O$, 4–8% $B_2O_3$, 1–5% $TiO_2$, 3–8% $ZrO_2$, 45–55% PbO, and 28–38% $SiO_2$.

9. An enamel according to claim 8 wherein said flux also contains 0–4% CdO, 0–3% ZnO, 0–3% $Al_2O_3$, 0–3% $Y_2O_3$, 0–4% $Ta_2O_5$, and 0–2% $SnO_2$.

10. An enamel according to claim 8 wherein the sum of all additions to the $Li_2O$-$B_2O_3$-$TiO_2$-$ZrO_2$-PbO-$SiO_2$ system is no more than 8% of the total composition.

11. An enamel according to claim 9 wherein said enamel flux consists essentially, in weight percent on the oxide basis, of about 1–1.5% $Li_2O$, 5–6% $B_2O_3$, 2–2.5% $TiO_2$, 4–6% $ZrO_2$, 48–51% PbO, 1–2% CdO, and 33–37% $SiO_2$.

* * * * *

UNITED STATES PATENT AND TRADEMARK OFFICE
CERTIFICATE OF CORRECTION

PATENT NO. : 4,038,448

DATED : July 26, 1977

INVENTOR(S) : David C. Boyd, Francis A. Cantaloupe, William H. Dumbaugh, Jr., James E. Flannery, Louis M. Holleran, Sylvester R. Sandor, and Dale R. Wexell It is certified that error appears in the above-identified patent and that said Letters Patent are hereby corrected as shown below:

Column 1, line 54, "gloss" should be -- glass --.

Column 2, line 34, "desired" should be -- desire --.

Signed and Sealed this

Twenty-seventh Day of December 1977

[SEAL]

Attest:

RUTH C. MASON
Attesting Officer

LUTRELLE F. PARKER
Acting Commissioner of Patents and Trademarks